United States Patent [19]

Penn

[11] 4,316,303
[45] Feb. 23, 1982

[54] AUXILIARY WINDSHIELD AND WINDOW WIPER

[76] Inventor: Silas Penn, 5316 Sheridan, Detroit, Mich. 48213

[21] Appl. No.: 136,895

[22] Filed: Apr. 3, 1980

[51] Int. Cl.³ .............................................. B60S 1/08
[52] U.S. Cl. ................................. 15/250.3; 15/250.31
[58] Field of Search ........................... 15/250.3–250.42

[56] References Cited

U.S. PATENT DOCUMENTS

| | | | |
|---|---|---|---|
| 1,796,223 | 3/1931 | Strang | 15/250.3 |
| 2,904,805 | 9/1959 | Dardig | 15/97 R |
| 2,967,314 | 1/1961 | Kowalewski | 15/246 X |
| 3,239,868 | 3/1966 | Di Vito | 15/246 |
| 3,448,480 | 6/1969 | Couget | 15/250.3 X |
| 3,978,542 | 9/1976 | van Eekelen et al. | 15/250.30 |
| 4,027,354 | 6/1977 | Burpee | 15/250.30 |

FOREIGN PATENT DOCUMENTS 909789  11/1962  United Kingdom ............... 15/250.3

*Primary Examiner*—Peter Feldman
*Attorney, Agent, or Firm*—Hauke and Patalidis

[57] ABSTRACT

An auxiliary portable and removable windshield and window wiper, for a motor vehicle, consisting of a wiper unit comprising an electrically driven motor oscillating a wiper blade and adapted to be mounted on the exterior of the motor vehicle body by, for example, a pair of strong magnets engaged with a metallic portion of the body proximate a rear window, a side window, or the windshield, with the wiper blade disposed over the window or windshield transparent surface. Electric power for the motor is supplied by an electric line provided on its end with a plug engageable within the cigarette lighter socket in the dashboard, the electric line being passed from the exterior to the interior of the vehicle, for example between the edge of a window and the window frame or opening window.

4 Claims, 6 Drawing Figures

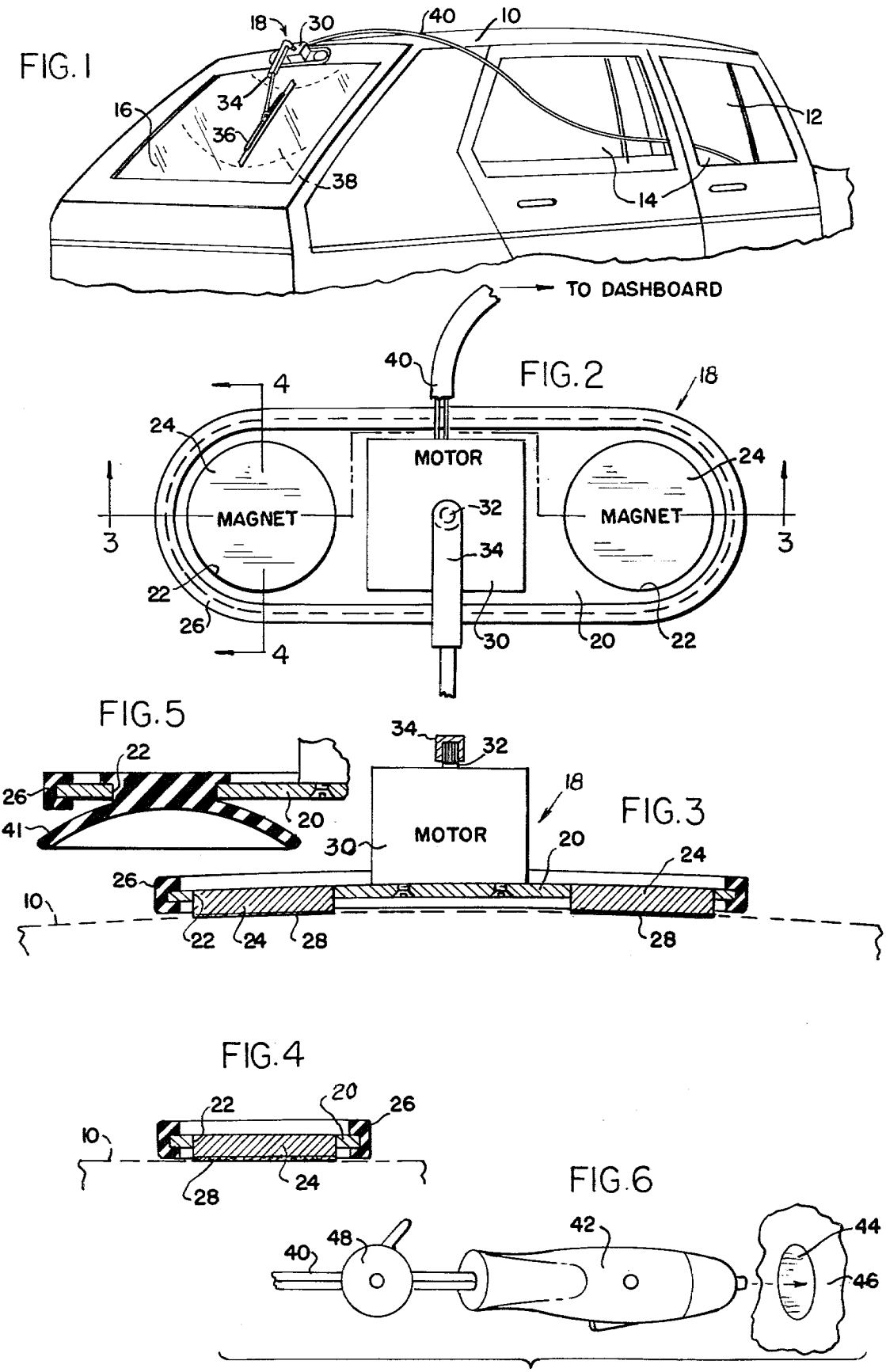

AUXILIARY WINDSHIELD AND WINDOW WIPER

BACKGROUND OF THE INVENTION

The present invention relates to a motor vehicle accessory and more particularly to a removable, portable auxiliary window or windshield wiper.

Motor vehicles, such as passenger cars having a slanted or "fast-back" rear window, are sometimes provided with a rear window wiper, similar to a conventional windshield wiper, but having its wiper blade operated from the rotatably oscillating drive shaft of an electric motor mounted in the interior of the vehicle body, the drive shaft passing through an opening in the body for connection to the wiper blade arm, the wiper blade being disposed in engagement with the exterior surface of the window such as to wipe an arcuate area to improve the driver's vision through the window in case of rain or snow.

Such a window wiper accessory is generally not standard and, when requested while purchasing an automobile, is installed by the dealer and is charged extra. When the automobile is sold by the owner or traded in, the auxiliary windshield wiper remains attached to the vehicle, as it cannot be easily removed and installed on another automobile. In addition, the auxiliary wiper is installed in a fixed position and, in the not uncommon occurrence of failure of the standard windshield wipers, the auxiliary wiper is not available for wiping clean a portion of the windshield.

The present invention provides an auxiliary, portable and removable wiper unit which may be installed at will at any location on the body of a motor vehicle to be operative on any window surface area which can be transferred from one motor vehicle to another one, which may be stored away when not in use, and which can be used as a replacement for conventional windshield wipers in emergencies, in the event that the motor vehicle conventional windshield wipers are inoperative.

SUMMARY OF THE INVENTION

The present invention accomplishes its principal objects as a result of providing a portable removable windshield and window wiper unit provided with a mounting base having preferably magnets for attachment to a metallic portion of a motor vehicle body proximate a window surface which it is desired to sweep clean, the mounting plate supporting an electric motor having a driveshaft rotatably reciprocable and to which is attached an arm supporting a wiper blade.

The many objects and advantages of the present invention will become apparent to those skilled in the art when the following description of the best modes contemplated for practicing the invention is read in conjunction with the drawing wherein:

BRIEF DESCRIPTION OF THE DRAWING

FIG. 1 illustrates a portion of a motor vehicle body having a rear window provided with the auxiliary, portable and removable wiper accessory of the present invention;

FIG. 2 is a fractional front elevation view of an example of structure embodying the present invention;

FIG. 3 is a sectional view along line 3—3 of FIG. 2;

FIG. 4 is a sectional view along line 4—4 of FIG. 2;

FIG. 5 is a fractional view similar to FIG. 3 but showing a modification thereof, and FIG. 6 is a schematic perspective view of a cigarette lighter adaptor plug for electrically connecting the wiper unit of the invention to a motor vehicle electrical system.

DETAILED DESCRIPTION OF THE PREFERRED EMBODIMENTS

Referring to FIG. 1, there is illustrated a motor vehicle body, such as a passenger car body 10, provided in a conventional manner with a windshield 12 and side windows 14. The passenger car body 10 is also provided with a rear window 16 which, in the example of structure illustrated, is slanted and could be subject to an accumulation of rain or snow which may hamper or obstruct rearward vision of the driver through the rear window 16. The present invention takes the form of a removable portable wiper unit 18 attachable to the outer surface of the body 10 at any convenient location such as, for example and as illustrated at FIG. 1, to a metallic portion of the body proximate to or at the edge of the rear window 16.

As shown generally at FIG. 1, and in more detail at FIGS. 2-4, the wiper unit 18 comprises an elongated substantially rectangular mounting plate 20, as illustrated which is preferably made of non-magnetic material such as aluminum or plastic, having two widely spaced apart lateral mounting apertures 22 each disposed proximate an end of the plate 20 and in each of which is mounted a strong permanent magnet 24 press-fitted, cemented, or otherwise fastened in the mounting aperture 22. One face of each magnet 24 projects a short distance from the plane of the mounting plate 20 for engagement, through magnetic attraction, with a steel portion of the passenger car body 10, for example at the upper edge of the rear window 16, as shown at FIG. 1.

The periphery of the mounting plate 20 is provided preferably with a rubber, or the like, marginal frame 26 which, in view of the coefficient of friction of the material used helps in preventing lateral displacement of the mounting plate 20 when magnetically held in position, and which protects the edge and enhances the appearance of the mounting plate 20, while preventing fingers from contacting the sharp edge of the mounting plate and avoiding marring the paint surface finish of the passenger car body 10. In addition, if so desired, the face of the magnets 24 engaged with the passenger car body surface may be provided with a thin fabric or felt liner 28, as best shown at FIGS. 3-4, held against the face of the magnet by an appropriate adhesive, for the purpose of protecting the painted surface of the passenger car against scratching or marring when the wiper unit 18 is magnetically attached to a portion of the body.

A windshield wiper electric motor 30 is mounted between the magnets 24 on the face of the mounting plate 20 opposite to the face from which the magnets 24 project. The electric motor 30 is of a type similar to the permanently attached motor used for operating motor vehicle rear window wipers, and has a drive shaft 32 extending substantially perpendicular to the mounting plate 20, as best shown in FIG. 3, which, instead of being driven continuously in rotation, is driven in rotation for a predetermined arc of about 120°-160°, and reverses itself and rotates an equal arc of circumference in an opposite direction, therefore rotatably oscillating back and forth. A support arm 34 is mounted on the end of the driveshaft 32 and carries on its end a wiper blade 36, FIG. 1, so that, when the electric motor 30 is activated, a predetermined area of the rear window 16, as shown at 38, is subjected to the action of the wiper blade 36.

Electrical power is supplied to the electric motor 30 from the electrical system of the motor vehicle via a two-conductor weatherproof cable 40 which is passed between the edge of any appropriate operable window and the corresponding edge of the window frame. As illustrated at FIG. 6, the free end of the electrical cable 40 is provided with a contact plug 42 for connection to the electrical system of the motor vehicle through a cigarette lighter socket 44, for example, in the dashboard or instrument panel 46 of the vehicle. If so desired, a switch 48 may be placed in series in one of the conductors of the cable 40 or may be provided as a built-in unit in the plug connector 42.

It will be readily appreciated that although a pair of magnets 24 is a preferred means for attaching the support plate 20 of the wiper unit 18 to an exterior surface of the motor vehicle body 10, other attachment means are contemplated by the invention, such as the use of an adhesive which, although it presents the inconvenience of possibly marring the paint finish of the motor vehicle body, is available for removably attaching the wiper unit directly to a glass surface. Alternatively, and as illustrated at FIG. 5, suction cups, such as the suction cup 41 attached in the aperture 22 of the mounting plate 20, may be used for removably attaching the mounting of the wiper unit 18 on any appropriate smooth surface, a glass surface as well as a body metallic surface, or for attachment of the wiper unit 18 to a body surface of a motor vehicle whose body is made of plastic.

It will be further appreciated that, because the wiper unit 18 can be removably mounted in any position where its magnet-provided or suction cup provided, mounting plate 20 may be attached to any appropriate exterior portion of the body 10, it may be positioned such that, for example, the wiper blade 36 operates on a side window 14 or, more particularly in an emergency resulting from the conventional windshield wipers becoming inoperative, the wiper unit 18 may be conveniently attached for example to the top of the windshield 12, on the driver's side, such as to wipe clean an area of the windshield in front of the driver during a rain or snow fall. It can also be seen that the wiper unit 18 may be stored inside of the vehicle when not in use, and it can easily be transferred from one vehicle to another, as the need arises.

Having thus described the present invention by way of an example of structure thereof given for illustrative purpose only, modification thereof will be apparent to those skilled in the art, what is claimed as new is as follows:

1. A removable portable wiper unit for motor vehicle, said wiper unit comprising an elongated substantially rectangular mounting plate, a rubber-like marginal frame mounted on the edge of said mounting plate, means for removably attaching said mounting plate to the exterior of a portion of a motor vehicle body proximate the edge of a transparent surface, said attaching means consisting of two intersurface adherence means each disposed proximate an end of said mounting plate between said mounting plate and said body surface, an electric motor mounted on said mounting plate between said attaching means and having a rotatably reciprocable drive shaft extending substantially perpendicular to said mounting plate, a windshield wiper support arm mounted on one end of said shaft, a windshield wiper blade mounted on the other end of said arm, and means for controllably connecting said electric motor to the electrical system of said motor vehicle, wherein said means for connecting said electric motor to the electrical system of said motor vehicle comprises an electric cable, an electrical contact plug on the end of said cable for engagement in a cigarette lighter socket, and an electrical on-off switch connected in said electrical cable.

2. The wiper unit of claim 1 wherein said means for attaching said mounting plate to said body comprises two permanent magnets each having a face engageable with a metallic portion of said body.

3. The wiper unit of claim 2 wherein said faces of said magnets are provided with a protective covering.

4. The wiper unit of claim 1 wherein said means for attaching said mounting plate to said body comprises two suction cups.

* * * * *